(12) United States Patent
Tanner et al.

(10) Patent No.: US 10,356,439 B2
(45) Date of Patent: Jul. 16, 2019

(54) FLEXIBLE FRAME REFERENCING FOR DISPLAY TRANSPORT

(71) Applicant: Intel Corporation, Santa Clara, CA (US)

(72) Inventors: Jason Tanner, Folsom, CA (US); Paul S. Diefenbaugh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/637,719

(22) Filed: Jun. 29, 2017

(65) Prior Publication Data

US 2019/0007698 A1    Jan. 3, 2019

(51) Int. Cl.
*H04N 19/103* (2014.01)
*H04N 19/573* (2014.01)
*H04N 19/577* (2014.01)
*H04N 19/172* (2014.01)

(52) U.S. Cl.
CPC ......... *H04N 19/573* (2014.11); *H04N 19/103* (2014.11); *H04N 19/172* (2014.11); *H04N 19/577* (2014.11)

(58) Field of Classification Search
CPC .. H04N 19/573; H04N 19/103; H04N 19/172; H04N 19/577
See application file for complete search history.

(56) References Cited

U.S. PATENT DOCUMENTS

| | | | |
|---|---|---|---|
| 2002/0039450 A1* | 4/2002 | Kimoto | G06T 9/004 382/239 |
| 2003/0048208 A1* | 3/2003 | Karczewicz | H03M 7/42 341/67 |
| 2003/0179825 A1* | 9/2003 | Sekiguchi | G06T 9/008 375/240.1 |
| 2004/0013202 A1* | 1/2004 | Lainema | H04N 19/70 375/240.18 |
| 2010/0195722 A1* | 8/2010 | Boon | H04N 19/11 375/240.12 |
| 2011/0170606 A1* | 7/2011 | Zhang | H04N 19/51 375/240.16 |
| 2011/0292997 A1* | 12/2011 | An | H04N 19/119 375/240.03 |
| 2013/0034166 A1* | 2/2013 | Shiodera | H04N 19/105 375/240.16 |
| 2013/0294517 A1* | 11/2013 | Fujibayashi | H04N 19/52 375/240.16 |
| 2017/0347122 A1* | 11/2017 | Chou | H04N 19/60 |

OTHER PUBLICATIONS

U.S. Appl. No. 62/438,953, filed Dec. 23, 2016, Ansari, et al.

* cited by examiner

*Primary Examiner* — Jaison Joseph
(74) *Attorney, Agent, or Firm* — Finch & Maloney PLLC (57) ABSTRACT

Flexible frame referencing is described that is suitable for use with a display transport. In one example, the referencing is a method that includes receiving frames at a computer system for transmission to a display, sending frames to the display without inter-frame compression in an intra-frame mode, saving the sent frames to a reference frame list, switching the computer system to an inter-frame mode, selecting a reference frame from the reference frame list, compressing additional received frames using the selected reference frame, and sending the additional frames to the display compressed in the inter-frame mode.

18 Claims, 5 Drawing Sheets

FLEXIBLE FRAME REFERENCING FOR DISPLAY TRANSPORT

FIELD

The present description relates to display data communication and, in particular to using compression for such communication.

BACKGROUND

Computer and television monitors continue to increase in resolution as imaging and rendering technologies improve. The revolution of Full HD is being replaced with 4K, 5K, and 8K monitors. As a result existing monitor cabling standards must be improved to carry such high resolutions. Wireless connections are used to present images on projectors or display screens across a room. These connections are also being pushed to higher resolutions and may have limited bandwidth.

To allow increasingly higher resolutions through the same wired and wireless transports, some systems have changed from RAW image transmission to compressed image transmission. The transmitter and the monitor must both support compression and then the system may automatically or manually be configured for compression. This allows higher resolution to be displayed using the same original wired or wireless bandwidth. Adding this additional complexity requires configuration and compatibility between the transmitter and the monitor.

BRIEF DESCRIPTION OF THE DRAWING FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity.

DETAILED DESCRIPTION

New standards have been discussed that would provide a transport of image data between a computer, console, or set-top box, on the one side and a computer screen, television monitor, or projector on the other side. Such display standards contemplate a transport that is able to accommodate different bandwidths. The usefulness of the transport is improved as described herein by providing direct support for temporal video compression, along with RAW images, and spatial compression schemes. In addition, in embodiments herein, the mode of transmission may be switched during a display session, for example by stopping one transport format and then starting another transport format.

Intra-frame compression has been used for display protocols and offers compression rates in the range of 2:1 or 4:1. Such compression schemes compress one frame without reference to previous frames. The compression may be linear, spatial, block, or another type of compression. Intra-frame compression is often relatively simple to process and is well-adapted to how monitors operate. On the other hand, for video distribution, storage, and editing, inter-frame video compression is used. These types of video compression offer compression rates on the order of 100:1, depending on the content. Inter-frame compression uses temporal reference frames so future frames rely on the result of prior frames. Linear, spatial, and block compression may also be used with such temporal compression schemes. Such a high compression rate may be used to allow more and larger video frames to be sent through the same connection. High speed data and other types of information may also be added to the connection.

To allow a monitor to operate with temporal or inter-frame video compression, the compressed video must be available as a continuous stream. The compression relies on prior frames to compress the current frame. There are specific initial reference frames that are required. However, for a computer workstation or even for television viewing, the available video frames and display formats to be displayed may change during a display session when a different source URL (Universal Resource Locater) or channel is changed. As a result, the compression must wait for a reference frame to occur in the video stream. This causes a delay at the display after switching from one source, format, or scene to another. As a result, video transports support operation in different modes, but do not support changing from one mode to another without stopping a session and then starting a new session.

Many modern computing systems include internal fixed function hardware video encoders that are used to compress/decompress video for streaming, videoconferencing, and other purposes. In embodiments herein, they may be used also to provide the video to the display. In many computer systems, the encoder and decoder share the same set of hardware so even decoding an online video or a movie can impact the availability of the internal hardware encoder.

As described herein, the transport from the computer to the display is configured to switch back and forth between video and temporal compression format modes and RAW or intra compression modes. RAW is used herein to refer to a frame that is not compressed. This is particularly well-suited for TAD (Transport Agnostic Display) formats currently under discussion. Many display standards for monitors, projectors, televisions, etc. handle either RAW or intra-frame compressed pixel data. To be presented on the display, the pixel data must come in one of these forms, but not both or, at least, not both at the same time. Video codecs, on the other hand, use spatial (intra) and temporal (inter) frame compression within a frame. Intra only compression and inter-frame compression are typically not used interchangeably (e.g. a system that only supports intra only compression would not have a frame buffer to store reference frames typically for inter frame compression).

Figure 1:
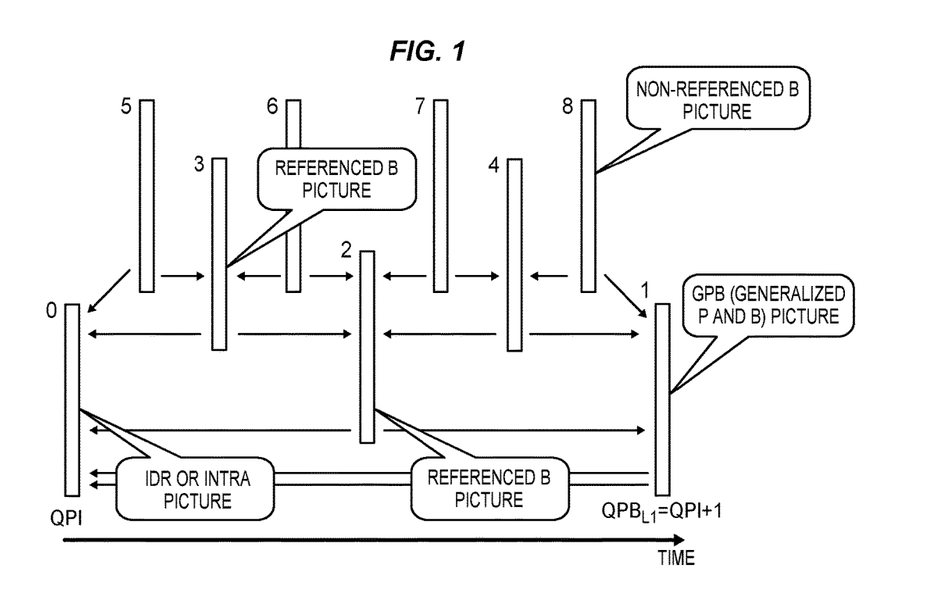
FIG. 1 is a block diagram of a temporal prediction hierarchy suitable for use with embodiment of the invention.

FIG. 1 is a diagram of an example of an inter-frame compression scheme. A sequence of frames is shown here for a temporal prediction hierarchy used in the HEVC (High Efficiency Video Coding) reference software encoder for a group of pictures as defined by the JCTVC (Joint Collaborative Team on Video Coding). A sequence of frames of a video sequence is captured over time from left to right. The first frame is an IDR (Instantaneous Decoding Refresh), Intra Picture or I frame indicated as frame 0. This is followed by B frames, indicated as frames 2-8, and one P frame indicated as frame 1. The number of frames of each type is determined by the video encoder. The hierarchy level is shown vertically. Non-referenced B pictures or frames 5, 6, 7, 8 are at the top of the hierarchy. Referenced B pictures 3, 4, are at a next lower hierarchy and another referenced B picture 2 is at a lower hierarchy. A generalized P and B (GPB) picture 1 is at the lowest hierarchy like the I picture 0.

Frames at the lowest levels of the hierarchy are coded with the lowest values of QP (Quantization Parameter), the default Quantization Parameter for the frame, resulting in higher bitrates and higher quality levels. Pictures at lower layers of the hierarchy are used as references for temporal prediction of more of the other frames in the group of pictures, and hence benefit more from a higher level of video quality.

I frames (Intra Frames or Intra Pictures) are included in the lowest layer of the hierarchy and have the lowest value of QP, indicated in the diagram as QPI. At each successive level of hierarchy, the value of QP is increased resulting in lower bitrate and lower quality, as the coded frames are used less often as references. At the highest level of the hierarchy are non-referenced B frames (Bi-predictive inter frames), which are not used as references by any other frames in the group of pictures, and have the highest QP value. P frames (predictive inter frames) which reference only earlier frames stand between the highest and lowest levels of the hierarchy. For this illustrated example containing 4 levels of hierarchy, the QP value of the 4 level pictures, QPBL4, is equal to QPI+4.

The version of HEVC shown in the figure is one example of temporal compression but there are many variations to this example and there are many different types of temporal compression. This compression system like many other inter-frame compression systems work on the assumption that the video has scenes or segments in which most of the elements shown in any one frame are also shown in frames before or after it. The information regarding the common elements of a sequence of frames does not have to be described again for each frame until the video goes to a different view or scene. These temporal types of compression are referred to herein as inter-frame compression. These compression approaches require a sequence of frames, i.e. video and start with a reference frame that includes full detail for the whole frame. The subsequent frames are then compressed based on information in the reference frame.

Intra-frame compression, on the other hand, works on the assumption that many elements of a frame are the same but the compression does not make assumptions about common elements from one frame to the next. In other words, the pixels for a blue sky may be encoded as a first blue pixel and then the neighboring pixels reference the first blue pixel instead of including the specific blue color, intensity, and brightness information. In other words, reference is made to pixels in the same frame and not to pixels in previous frames. Intra-frame compression schemes often use linear, spatial, or block approaches to compressing a frame. Linear, spatial and block approaches are also used in various inter-frame compression schemes.

Figure 2:
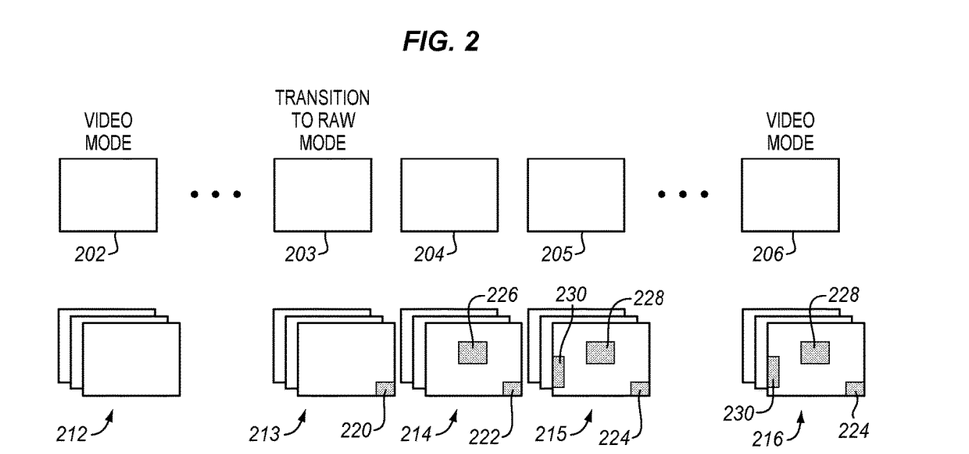
FIG. 2 is a block diagram of transmitted display frames according to an embodiment.

FIG. 2 is a diagram of a sequence of frames that may be rendered on a display, such as a monitor or projector. This is an example of how a user might use a system. At the left, the display starts in a video display mode with a sequence of video frames 202 shown as the left side of the top row. The bottom row shows reference pictures 212 used in the video mode. At this first stage 202, the transport from the computing system to the display is sent in the video mode.

Very high compression rates are achieved by using the inter-frame compression capabilities of the computing system. The compressed frames are then decoded by the display on the other side of the transport. As mentioned this may be a wired or wireless transport. In either case, the transport may be shared with devices so that it performs other functions. By sending the frames in the video mode with very high compression, the transport is freed for other uses, such as file transfers, or other video streams.

At a later time in this example, additional demands are placed on the computing system so that the video compression capability of the computing system is no longer available for the display transport. At 203, the computing system switches the display transport to an intra frame mode. This may use RAW frames or linear, spatial, or block intra-frame compressed frames. This may occur as an example, when the user begins to play a movie from a video web site in a windowed browser. The movie playback uses a video decoder to decode the video as it is received from the source. The system may only have one video decode/encode unit. As a result, at a certain point in time, depending on frame rate, resolution, frequency, system thermal limitations, etc., there is a performance limitation that the encode of the display transport and the decode of the movie are not both possible within the thermal budget, processing speed, hardware resources, or available frame time. If the video decoding begins to exceed a frame time, either the video decode will begin to stutter or the encode of the frames for display will begin to drop with either situation resulting in a poor user experience.

To avoid the stuttering or dropping, the display mode switches to RAW or intra-frame compression frames 203, 204, 205 after some number of frames of inter-frame or temporal compressed video. In some cases, the temporal compression cannot be sustained due to limits of the computing system. In many systems intra-frame compression will use a different set of hardware than the inter-frame compression. Switching to intra-frame compression reduces the load on the video encode/decode hardware or software processing resources. The switch may also be made because of a change in the frames that are to be displayed. Incoming frames may be better suited to intra-frame compression than the existing inter-frame compression.

In the example of decoding a movie, if the video is windowed and not full screen, then only the part of the screen that includes the window needs to be updated. The rest of the display, in this example, is static. As a result, the reference frame list may be repurposed as a frame buffer and PSR2 (Panel Self Refresh) selective updates may be populated to the video window of the reference frame. PSR2 updates are small spatial updates that are used when only a small portion of a screen has changed, such as a video window.

The RAW mode frames 213 have a small window 220 that may be updated with PSR2 updates. The small window 220 varies over time 222, 224 in later frames 214, 215 and the PSR2 updates continue. During the session, additional windows 226, 230 may appear on the display. These are also updated. The final state of the last linear mode frame 215 has three windows or panels 224, 228, 230. These are part of the saved last frame.

In this example, once the video stops playback and the decoding resources of the computing system are no longer needed, the display can switch back to an inter-frame video compression mode as with frame 206. The video reference list for the inter-frame mode frames may reference the last saved frame 215 and the updates from the PSR2 updates to the display frame. Instead of using the last frame 215, an earlier frame 213, 214 may be used as the reference frame combined with the PSR2 updates. The updates may include the content that was finished on the decode video (usually the last frame of the video), the time being updated, and any other changes such as those caused as a result of user interaction.

In embodiments described herein, a RAW stream may be used as a reference for an inter-frame compression scheme. Even when there are PSR2 updates, the reference window may be updated selectively. These changes optimize the display transport for system resource availability, types of content, how the content has changed, and bandwidth availability which may change depending on particular transport methods.

As described, the updates from the RAW or intra-frame compression are used to modify the video reference frame buffer. This reduces the bandwidth needed when inter-frame mode commences at frame 206. It also reduces the encoder run time since the parts needing compression run much quicker through the encoder. Without allowing a reference frame buffer to persist, the inter-frame mode could not be restarted before starting a new video stream. Every video stream starts with an I frame (intra frame) which can take five or more times the bandwidth to achieve the same quality as a temporally predicted frame depending on content. The PSR2 updates also reduce the bandwidth and encode time needed to compress the frame since the reference frame is more accurate compared to what the next frame needs to be. As an example of the accuracy, the time may have been updated and the RAW pixels sent which won't have any block based compression artifacts.

Enabling and disabling the encoder may also be impacted by the type and size of the frame updates. If HEVC is used for inter-frame compression with an LCU (Largest Coding Unit) of 64×64, a small change of e.g. 4 pixels in a 2×2 pattern can trigger a change of 4 LCUs that would need to be encoded (i.e. 256×256). Accordingly, far less data is required to send just the 4 pixels in RAW mode rather than the 4 LCUs. Also some content compresses well with intra-frame compression. A text document, for example, has a high compression rate with static compression using, for example, linear compression with run length encoding. Even if the linear compression rate were the same as the inter-frame compression rate for a particular display, it may be better to use intra-frame compression. This avoids using the encoder which would increase power draw or compete with other encoder workflows. In some cases, it may be better to use RAW transmission because the compression rate is low for any type of compression.

Figure 3:
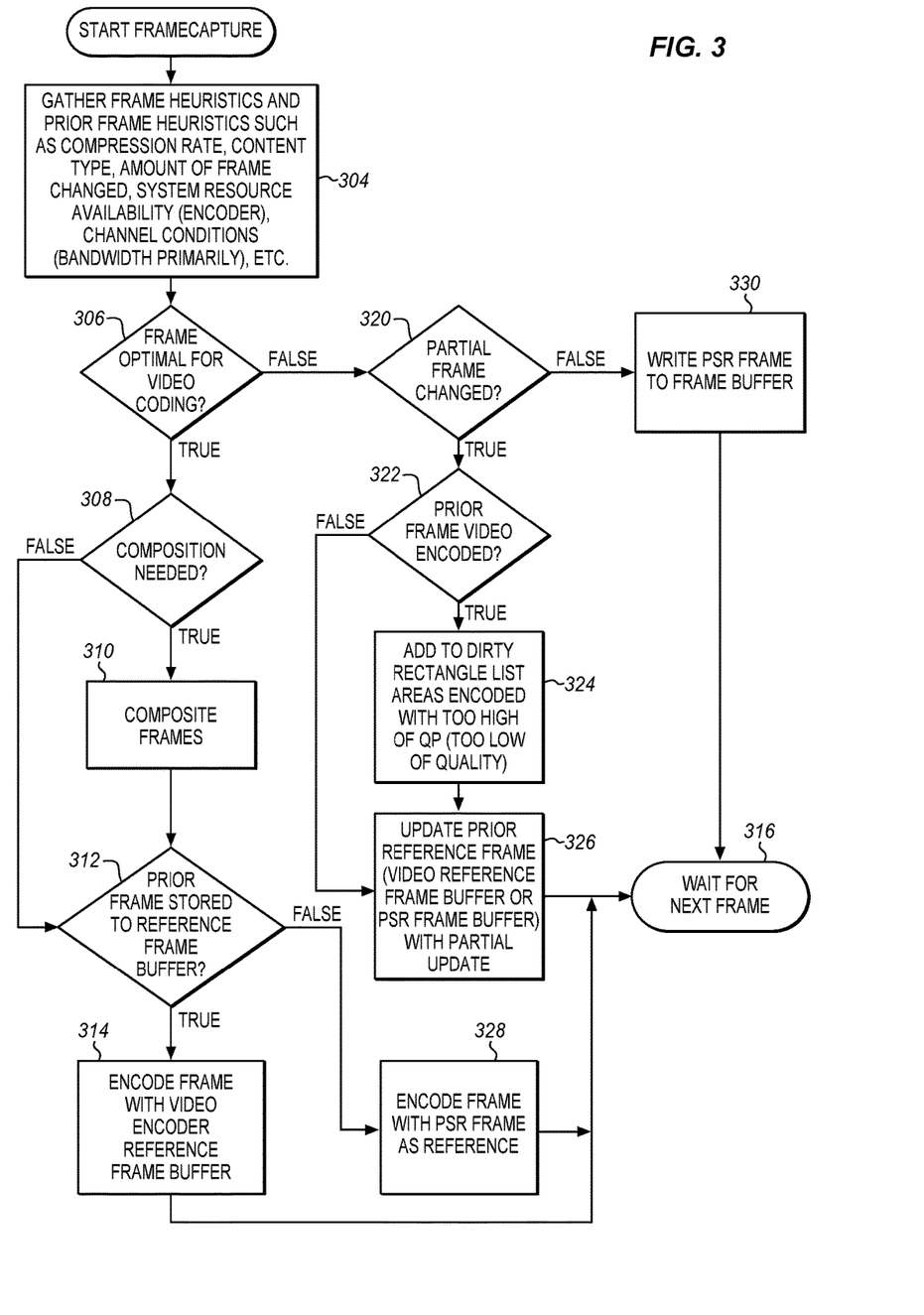
FIG. 3 is a process flow diagram of encoding and transmitting a sequence of display frames according to an embodiment.

FIG. 3 is a process flow diagram of transmitting frames to a display in different modes. The process is shown from the transmit side where decisions are made between the different possible compression and RAW modes. Frames are transmitted and a reference frame list is updated for use by the video encoder.

The process starts at 302 with frame capture for transmission to a display through a display transport. This start is the start of a video session. When a frame begins capture, a number of heuristics may be assessed at 304 to determine which display mode to use. The modes mentioned herein include RAW, linear or intra-frame compression, and temporal or inter-frame video compression. There may be different variations on these modes and other modes not mentioned here. The gathered heuristics include system or hardware information and frame or video sequence information.

The system information may include available system power. The process may operate differently on battery power or with a low battery or when other components are using part of the available power. The system information may include system temperature or thermal budget. The system may operate differently when it is cool from when other processes have caused significant heat generation. The system information may include the availability of the encoder engine. If encoder hardware is busy with other processes, then temporal compression may be avoided. The system information may include available bandwidth on the connection to the display. System operation may be different for a low resolution wired display than from a very high resolution display. In some cases, the wired display connection may also be used for other purposes, such as audio, large file transfers, multiple displays, etc., reducing the bandwidth available for the display. There may also be wireless connections that do not offer as much bandwidth. The system information may include desired display quality, latency limitations, etc. so that the system will favor or not favor quality over other factors, such as power, heat, or bandwidth.

The frame or video sequence heuristics may include the compression rate of prior frames, the amount of a frame that has changed, and the quality of the last frame transmission. The source format of the incoming frame may also be considered. If the frames are received as temporally compressed video, for example, when compressed video is played full screen, then it may be more efficient to transmit the video directly. It will then be decoded on the other side of the display transport connection at the display.

At 306, the heuristics are applied to determine whether inter-frame video encoding will be used. Once the display mode is selected at 306, if it is inter-frame, then it is determined at 308 whether composition is needed. If so, then at 310, the composite frames are generated. If there is no composition, then the process skips to selecting a reference frame starting at 312 for use in the inter-frame compression. This reference frame will serve a function like that of an I frame in HEVC. After composition at 310, the process also goes to find a reference frame at 314.

First, a reference frame buffer is checked at 312. If there is a prior stored reference frame in the buffer, then at 314 it is used to encode the frame in a video encoder. The process then goes to analyze the next frame at 316 and returns to 304.

Normally in a video sequence, the last reference frame is used to encode any subsequent frames until the next reference frame occurs. The reference frame may be the last video frame encoded or it could be the last frame sent out by a display engine to the display using the RAW or intra-frame compression mode. In some embodiments a reference frame buffer accessible to the system contains a list of reference frames and the last video frame is the first entry in that list of reference frames. This buffer may also be used to store RAW or intra-frame compression mode frames for use as the last reference frame.

If there is no suitable last reference frame in the buffer, then at 328 a window within the last frame may be used. This may occur, for example, when the last video frame was encoded with PSR2 updates to the frame. The PSR2 frame will not have the full resolution of a full video reference frame, but using it avoids any delay or stutter in the sequence. The frame may then be encoded at or below a desired full bitrate. The frame is encoded and the system goes to process the next frame at 316. The encoded frame is transmitted over the channel and the video encoder will sleep until the next frame is ready.

For some frames the frame or the system heuristics will result in a decision that the frame is not selected for inter-frame video encoding at 306. This takes the system to a second branch from the video mode decision at 306. This second branch is for more traditional display modes, e.g. RAW mode or intra-frame compression mode. The first decision in the second branch is whether a partial or entire frame has changed from the last frame at 320. If the entire frame needs to be updated, then at 330 that frame is stored in a frame buffer. This frame may be used for a later frame as a reference frame in inter-frame mode. The system waits for the next frame at 316 and cycles back to 304.

The PSR (panel self-refresh) frame may be used as a feature for when the frame doesn't change. In this case the last frame is transmitted to the display or an indication is sent that there was no change. The last frame may be stored in each case for future reference. It may be stored in the reference frame buffer as mentioned above, or in another location. This frame can become a reference to the video encoder as mentioned above.

When a partial frame has changed at 322, then it is determined whether the prior frame, the frame before the partially changed frame, was inter-frame encoded or not at 322. If the prior frame was inter-frame encoded, there may be visual artifacts depending on the QP (Quantization Parameter) used. This may occur for example, if the channel to the display was congested due to file transfers or some other channel activity. Artifacts may be tracked with a dirty rectangle list. At 324, the dirty rectangle list may be updated with the regions that might benefit from being transmitted again. The prior reference frame may then be updated with the PSR2 dirty rectangles at 326. This makes these rectangles available as a reference the next time the transport switches back to a full or partial inter-frame mode and the video engine starts again. The updated prior frame may be used as a reference frame if the system switches back to inter-frame mode. The process goes to the next frame at 316.

The described use of a reference list and dirty rectangle list may violate some video codec specifications because the reconstructed frame buffers in the reference list are not updated solely by the bitstream. The described modification of the frame buffers still allows the frame buffer techniques to work with standard encoders and decoders. As a result, the encoder and decoder hardware and software is not necessarily affected. Only the manner of generating the reference frames.

The process of FIG. 3 may be modified or further detailed in a variety of different ways. The PSR2 updates are used to maintain a current reference frame for use by the video compression. These updates may be enhanced or simplified. Inasmuch as the initial reference frame is only used until an I picture arrives in the stream, there may be artifacts and errors in the original reference frame without any longer term effect. As described, when there is a partial frame change in the intra-frame mode at 320, then PSR updates are made at 330 or 326. This updated frame is then ready for use if the mode changes at 306 and the reference frame is taken from the buffer at 314.

Figure 4:
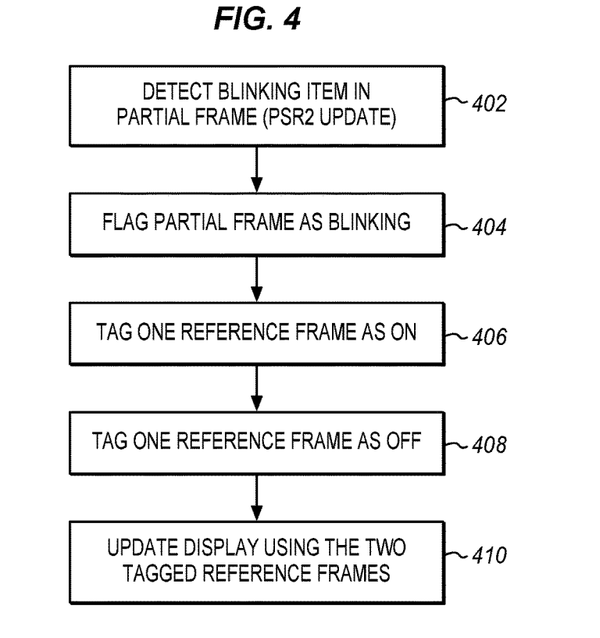
FIG. 4 is a process flow diagram of updating frames with a blinking item according to an embodiment.

In order to simplify the update process, the updates may be made selectively. Many animations in a productivity usage are blinking cursors or icons. It may be more efficient to not update the blinking items in some situations. The updates may be flagged so that the PSR updates and the reference list updates are done on a selective basis. The reference list may be modified to point to which of two references to use. One reference in the reference list may be used for the blinking icon in the ON state and the other reference may be used for the blinking icon in the OFF state. The PSR update then toggles between these two references as needed for updating the display.

This approach is shown in the process flow diagram of FIG. 4. At 402 the system detects that there is a blinking item in a part of the frame. This may be done by comparing PSR2 updates to see that the same update is repeated as the item blinks. Blinking is used here to refer to any alternating motion, whether it is from light to dark, from one position to another, or another alternating, repeating variation in a small part of the frame. A blinking cursor is just one example of such an item.

At 404 the partial frame is tagged for reference as blinking. At 406 one of the reference frames is tagged as ON or as an initial position. At 408 one of the reference frames is tagged as OFF or as a secondary position. At 410 the display is updated using the two tagged reference frames by alternating between the two, sending one to the display, then sending the other one to the display, etc.

In order to improve the enhancement of reference frames such as at 326, the updates may be prioritized. The PSR2 updates may be graded based on importance to the image quality. In the FIG. 3 example, partial changes in display mode may be ranked based on the quality or the QP of the encoding. The dirty rectangles may be associated with a priority list. Priority may be according to channel conditions or other parameters. The PSR2 updates can do the selective updates of the highest priority rectangles and discard or postpone the portions that might already have been encoded at a sufficiently high quality. If a minimum QP (quantization parameter), e.g. 15 is used and a section was encoded at 17, an update may be helpful but not required, depending on whether other system demands, such as bandwidth or power are more important.

Figure 5:
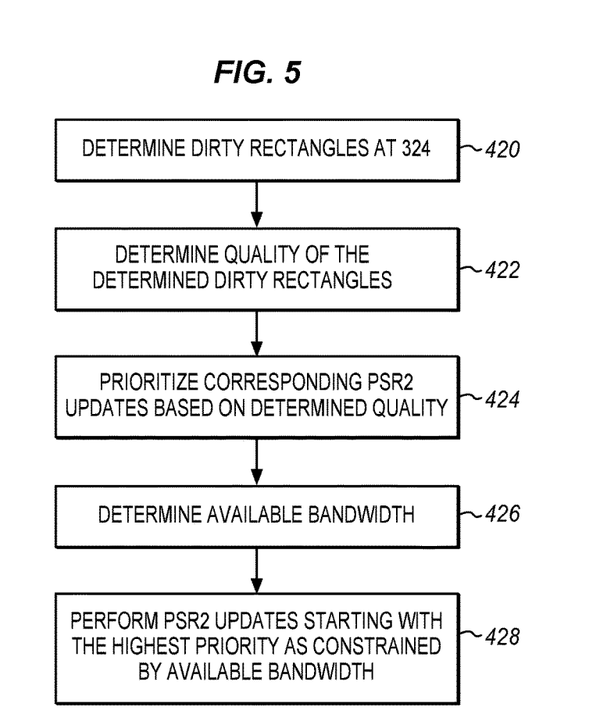
FIG. 5 is a process flow diagram of prioritizing partial self-refresh updates according to an embodiment.

FIG. 5 shows a further optional expansion of adding dirty rectangle areas at 324. Starting at 420 the dirty rectangle areas are determined. This may be the same operation as at 324. At 422 a quality is determined for each determined dirty rectangle. The quality may be errors, a number of errors, corruption, resolution compared to the full frame, or any other suitable quality. These are determined for each of the dirty rectangles. At 424 the dirty rectangles are prioritized based on the determined quality. In this way, those with the most errors, the most corruption, or the lowest quality, etc. will be put first in line or given the highest priority. Some rectangles may receive no priority because there are no significant errors or corruptions.

At 424 any bandwidth limitations are determined. This may be limitations in the available bandwidth in the transport or in any memory or processing resources. If there are no limitations, then all of the dirty rectangles are updated for later use with the reference frame. In this update, those rectangles without errors are not updated. If there are limitations, then the worst or dirtiest rectangles will be affected first followed by any remaining for which there is still available bandwidth. If there are bandwidth limitations, then the number of updated rectangles will be limited or constrained by the bandwidth limitations.

Another enhancement to the above is that a PSR2 update of compressed video may be sent with an x,y offset for where it belongs in the frame. So the display mode is RAW for the full frame and then the video comes as a smaller window. The decode asset that already exists is used to decode the video stream. That video stream is a small update in the larger frame which already exists for the PSR frame buffer. That frame buffer can be the same region of memory or different region of memory and selective multiplexing out through the transport to the display. This saves the resources of transcoding on the transmit side and sends the bitstream while using a minimal amount of bandwidth.

A variety of different techniques and enhancements have been described for providing a quality reference frame for starting the inter-frame mode. In some cases, the last frame may be used. In some cases, the reference frame is improved with PSR updates. In some cases, several frames are combined to form a reference frame. Another approach is to start with a frame that is generated and sent specifically for use as a reference frame.

If the display mode starts in the intra-frame mode with a RAW or compressed frame, particularly a lossless compressed frame, then this frame may be used as the reference frame for a switch to the inter-frame mode. The last RAW or intra-frame compressed frame can become the first reference frame in the frame buffer and used for prediction. The first suitable reference frame of a video sequence is an intra frame which does not have any spatial compression, that is it does not rely on any frames before or after it. It does have some type of linear compression to reduce the total buffer and transmission requirements. If link bandwidth is low, the quality of that I frame may be low and show visual artifacts. Subsequent temporally predicted frames in inter-frame compression mode can continue with these artifacts as bits are spent to improve quality. But if the last RAW or spatially predicted frame is used, the temporally predicted frames can use that as reference and be significantly lower bandwidth. This prevents visual quality issues as the transition to inter-frame compression from RAW or intra-frame compression happens.

An example of this is shown and described with respect to FIG. 2. Another example would be a display transport carried on USB (Universal Serial Bus) when there is enough bandwidth for RAW mode. When a large file transfer starts on that same USB link then the available bandwidth drops immediately and significantly. The display transport, as described herein, is able to switch to an inter-frame compression. By filling a reference frame buffer before changing modes, the inter-frame mode is able to predict off the last frame instead of starting a brand new stream. This provides a better appearing frame on the display compared to starting in the middle of a video stream or waiting for a reference frame in the video stream.

Figure 6:
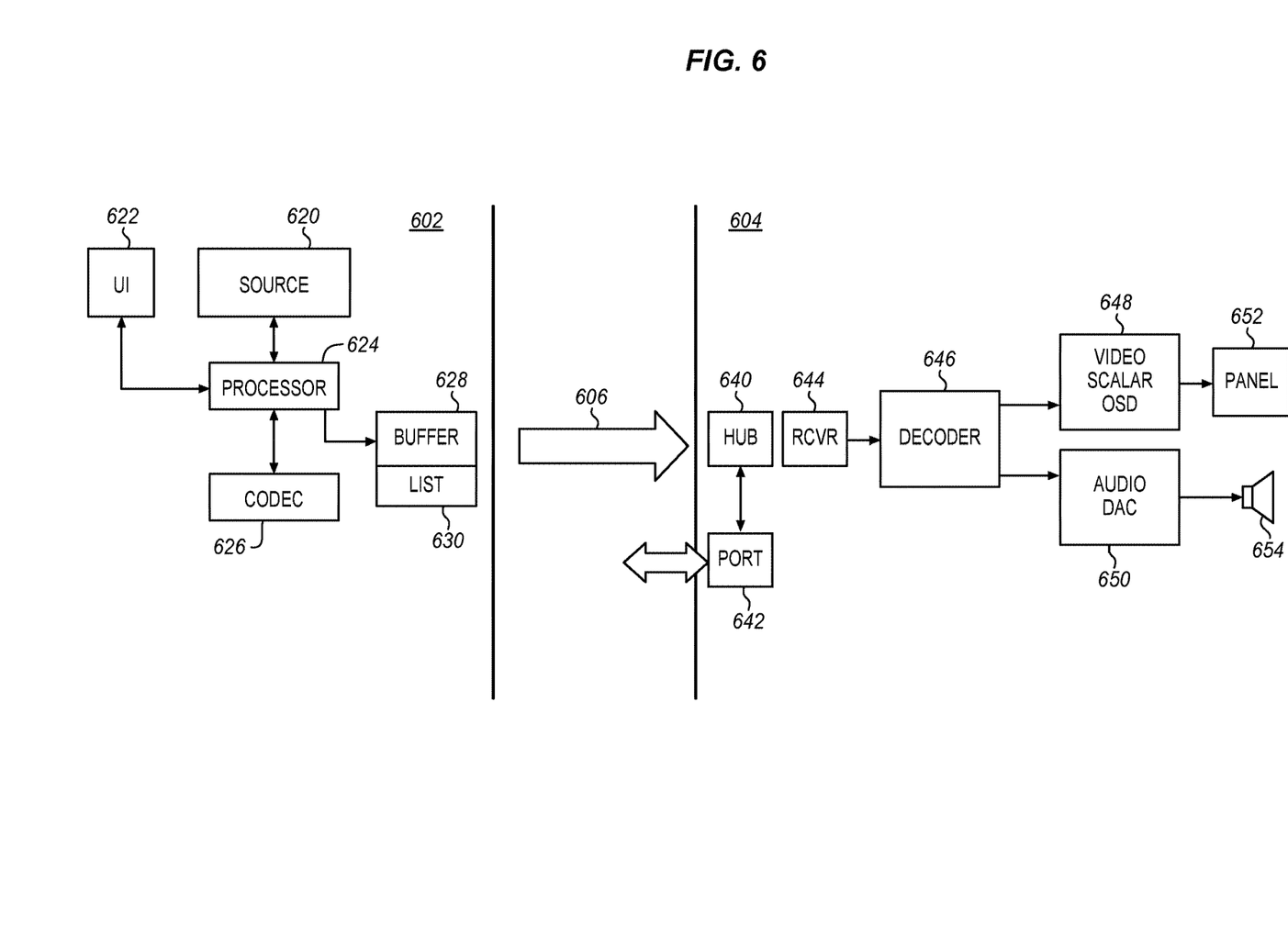
FIG. 6 is a block diagram of a display frame transmitter and a display for presenting display frames according to an embodiment.

FIG. 6 is a block diagram of a source 602 and a sink 604 connected by a transport 606. The source may be a computer, media player, set-top box, or other media device in any of a variety of different form factors, including desktop, notebook, tablet, or wearable. The sink is a display such as a monitor, projector, wearable or other device to show frames from the source. The transport may be any of a variety of different transports for video, data and other forms. The transport may be wired such as DisplayPort, Thunderbolt, or USB (Universal Serial Bus), etc. or wireless, such as WiDi (Wireless Display), WDA (Wireless Display Adapter), Miracast, AirPlay, etc. The transport may connect two separate devices, such as a workstation and a monitor, or it may internally connect parts of a single device such as a graphics adapter and a screen of a single notebook computer, tablet, or all-in-one computer.

The source device 602 has a media source 620, such as a memory, memory player, disk player, or streaming media receiver and a user interface 622. These are applied to a processor 624 which is coupled to a codec (coder/decoder) 626 which assists with compressing and decompressing any received or transmitted video as described above. The codec may be hardware or software and may also assist with other tasks. The processor is also coupled to a frame buffer 628 which includes or is coupled to a list 630 which may be used as a reference frame list, among other purposes. The buffer receives frames whether compressed or not for transmission across the transport 606.

The codec may be a part of the processor or a separate unit. The processor may be a full general purpose processor or a particular dedicated controller for use with the source, such as a DSP (Digital Signal Processor) or FPGA (Field Programmable Gate Array). There may also be other sources such as cameras, telephone transceivers, etc., additional processors, and additional components as shown, for example, in FIG. 7.

The frames in the buffer are sent through the transport to the sink device 604 which connects to the transport through a wired or wireless hub 640. The hub allows the display information to be forwarded to a receiver 644 and any other information to be passed to a port 642 for other components. The other components may be a part of the sink 604 or may be external and coupled to the source through the sink. With Thunderbolt and USB Type C, for example, the port may provide connections to mass storage, remote servers, graphics adapters, power supplies, additional displays, audio components, user interface devices, and many other types of components.

The receiver 644 passes the frames to the decoder 646 which decompresses any compressed frames and forwards the decompressed frames to a video block 648 which scales the frames for display, adds any on-screen display from the sink, and does any mixing, blending, or calibration to the frames. The video block then passes this signal to the display panel 652, projector, transducer or any other type of display device. The decoder also passes any audio component to an audio DAC (Digital Analog Converter) which provides an analog output to a loudspeaker 654, headphones, or any other suitable audio device. The DAC and the audio device may be internal or external to the sink.

The source and sink are provided only as examples and may have more or fewer features than those shown. The described techniques and system may be implemented on both the source and sink side of a transport, such as the proposed transport agnostic display VESA (Video Electronics Standards Association) standards including DisplayStream compression used for DisplayPort. The techniques may be implemented with no changes in the system except for those described herein. In some cases, the transport may be augmented with signaling to indicate the nature and type of compression being used, if any.

Figure 7:
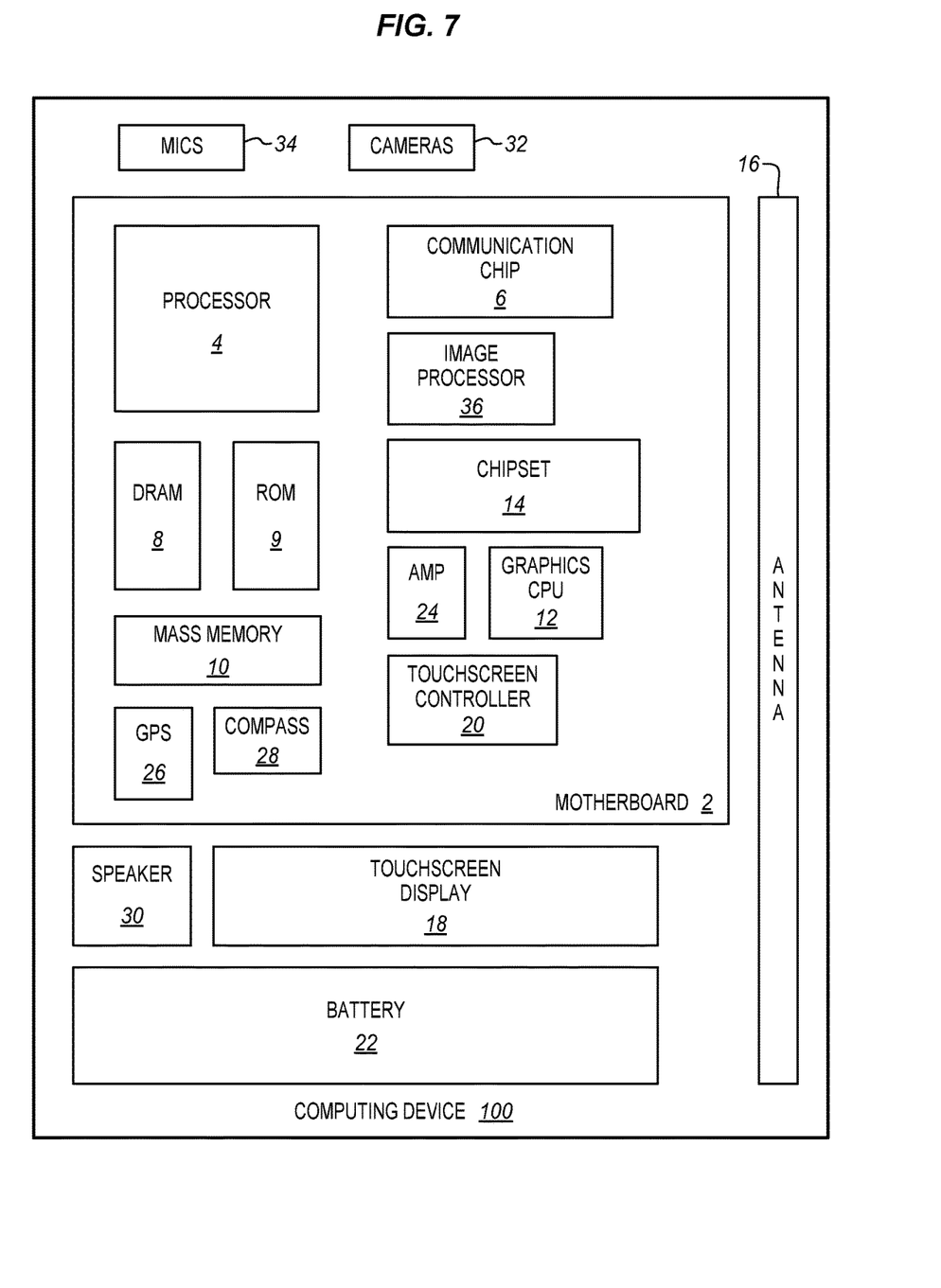
FIG. 7 is a block diagram of a computing device suitable for video capture and encoding according to an embodiment.

FIG. 7 is a block diagram of a computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 contain image sensors with pixel arrays, controllers, and readouts as described herein. The image sensors may use the resources of an image processing chip 3 to read values and also to perform format conversion, coding and decoding, noise reduction and 3D mapping, etc. The processor 4 is coupled to the image processing chip to drive the processes, set parameters, etc. The image processing chip may perform video codec functions as described above or these functions may be implemented using the graphics CPU, a chipset component, a core of the processor or a different component of the system. All of these components may be incorporated into a SOC or fabricated as one or more different chips connected together. The I2C/I3C and MIPI interfaces may be through the system board or through another medium.

In various implementations, the computing device 100 may be eyewear, a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 100 may be any other electronic device that processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims. The various features of the different embodiments may be variously combined with some features included and others excluded to suit a variety of different applications.

Some embodiments pertain to a method for frame referencing that includes receiving frames at a computer system for transmission to a display, sending frames to the display without inter-frame compression in an intra-frame mode, saving the sent frames to a reference frame list, switching the computer system to an inter-frame mode, selecting a reference frame from the reference frame list, compressing additional received frames using the selected reference frame, and sending the additional frames to the display compressed in the inter-frame mode.

Further embodiments include encoding the frames at the computer system using inter-frame compression before sending the additional frames Further embodiments include monitoring an encoding performance and sending frames in the intra-frame mode when the encoding performance is less than a threshold.

In further embodiments the encoding performance is determined by measuring a frame time.

Further embodiments include selecting between the intra-frame mode and the inter-frame mode by determining an amount of a frame that has changed in comparison to a previous frame.

In further embodiments the reference frame is the last frame sent in the intra-frame mode.

In further embodiments the last sent frame is the first frame in the reference frame list.

Further embodiments include improving the reference frame using partial self-refresh updates before compressing.

In further embodiments improving includes identifying dirty rectangles of the reference frame, prioritizing the identified dirty rectangles based on a quality of each dirty rectangle, and performing the partial self-refresh updates in order of the prioritization constrained by available bandwidth.

Further embodiments include discarding self-refresh updates from dirty rectangles with a low prioritization.

In further embodiments the reference frame comprises a prior frame combined with partial self-refresh updates.

In further embodiments saving the sent frames comprises saving a frame and saving partial self-refresh updates of subsequent frames to the saved frame.

In further embodiments saving the sent frames includes detecting a blinking item in a partial frame, flagging the partial frame as blinking, tagging a first reference frame as ON, and tagging a second reference frame as OFF.

In further embodiments sending the additional frames comprises sending the first and second reference frames in alternating sequence.

Some embodiments pertain to a computer system that includes a source to provide frames at a computer system for transmission through a display transport to a display, a processor to send frames to the display transport without inter-frame compression in an intra-frame mode, a reference frame list to list frames saved in a reference frame buffer, the processor further to switch the computer system to an inter-frame mode and to select a reference frame from the reference frame list, a codec to compress additional received frames using the selected reference frame, and the processor to send the additional frames to the display through the display transport compressed in the inter-frame mode.

In further embodiments the processor further improves the reference frame using partial self-refresh updates before compressing to form the reference frame combined with partial self-refresh updates.

In further embodiments improving includes identifying dirty rectangles of the reference frame, prioritizing the identified dirty rectangles based on a quality of each dirty rectangle, and performing the partial self-refresh updates in order of the prioritization constrained by available bandwidth.

Some embodiments pertain to a computing system that includes a display transport, a display device having a receiver to receive compressed frames from the display transport, a decoder to decompress the received frames and a panel to display the decompressed frames, and a computing device coupled to a source to provide frames for transmission through the display transport to the display device, the computing device having a reference frame list to list frames saved in a reference frame buffer, a codec to compress received frames in an inter-frame compression scheme using a selected reference frame from the reference frame buffer, and a processor to send frames to the display transport without inter-frame compression in an intra-frame mode, to switch to an inter-frame mode and to select a reference frame from the reference frame list, and to send additional frames to the display through the display transport compressed in the inter-frame mode.

In further embodiments the reference frame is the last frame sent in the intra-frame mode.

In further embodiments the processor is further to monitoring performance of the codec by measuring a frame time of the inter-frame compression and to send frames in the intra-frame mode when the codec performance is less than a threshold.

Some embodiment pertain to an apparatus that includes means for receiving frames at a computer system for transmission to a display, means for sending frames to the display without inter-frame compression in an intra-frame mode, means for saving the sent frames to a reference frame list, means for switching the computer system to an inter-frame mode, means for selecting a reference frame from the reference frame list, means for compressing additional received frames using the selected reference frame, and means for sending the additional frames to the display compressed in the inter-frame mode.

Further embodiments include means for encoding the frames at the computer system using inter-frame compression before sending the additional frames Further embodiments include means for monitoring an encoding performance and sending frames in the intra-frame mode when the encoding performance is less than a threshold.

In further embodiments the encoding performance is determined by measuring a frame time.

Further embodiments include means for selecting between the intra-frame mode and the inter-frame mode by determining an amount of a frame that has changed in comparison to a previous frame.

In further embodiments the reference frame is the last frame sent in the intra frame mode.

In further embodiments the last sent frame is the first frame in the reference frame list.

Further embodiments include means for improving the reference frame using partial self-refresh updates before compressing.

In further embodiments the means for improving includes means for identifying dirty rectangles of the reference frame, means for prioritizing the identified dirty rectangles based on a quality of each dirty rectangle, and means for performing the partial self-refresh updates in order of the prioritization constrained by available bandwidth.

Further embodiments include means for discarding self-refresh updates from dirty rectangles with a low prioritization.

In further embodiments the reference frame comprises a prior frame combined with partial self-refresh updates.

In further embodiments saving the sent frames comprises saving a frame and saving partial self-refresh updates of subsequent frames to the saved frame.

In further embodiments saving the sent frames includes detecting a blinking item in a partial frame, flagging the partial frame as blinking, tagging a first reference frame as ON, and tagging a second reference frame as OFF.

In further embodiments sending the additional frames comprises sending the first and second reference frames in alternating sequence.

What is claimed is:
1. A method comprising:
receiving frames at a computer system for transmission to a display;
sending frames to the display without inter-frame compression in an intra-frame mode;
saving the sent frames to a reference frame list;
switching the computer system to an inter-frame mode;
selecting a reference frame from the reference frame list;

compressing additional received frames using the selected reference frame;

improving the reference frame using partial self-refresh updates before compressing; and sending the additional frames to the display compressed in the inter-frame mode.

2. The method of claim 1, further comprising encoding the frames at the computer system using inter-frame compression before sending the additional frames.

3. The method of claim 2, further comprising monitoring an encoding performance and sending frames in the intra-frame mode when the encoding performance is less than a threshold.

4. The method of claim 2, wherein the encoding performance is determined by measuring a frame time.

5. The method of claim 1, further comprising selecting between the intra-frame mode and the inter-frame mode by determining an amount of a frame that has changed in comparison to a previous frame.

6. The method of claim 1, wherein the reference frame is the last frame sent in the intra-frame mode.

7. The method of claim 6, wherein the last sent frame is the first frame in the reference frame list.

8. The method of claim 1, wherein improving comprises:
identifying dirty rectangles of the reference frame;
prioritizing the identified dirty rectangles based on a quality of each dirty rectangle; and
performing the partial self-refresh updates in order of the prioritization constrained by available bandwidth.

9. The method of claim 8, further comprising discarding self-refresh updates from dirty rectangles with a low prioritization.

10. The method of claim 1, wherein the reference frame comprises a prior frame combined with partial self-refresh updates.

11. The method of claim 1, wherein saving the sent frames comprises saving a frame and saving partial self-refresh updates of subsequent frames to the saved frame.

12. The method of claim 1, wherein saving the sent frames comprises:
detecting a blinking item in a partial frame;
flagging the partial frame as blinking;
tagging a first reference frame as ON; and
tagging a second reference frame as OFF.

13. The method of claim 12, wherein sending the additional frames comprises sending the first and second reference frames in alternating sequence.

14. A computer system comprising:
a source to provide frames at a computer system for transmission through a display transport to a display;
a processor to send frames to the display transport without inter-frame compression in an intra-frame mode;
a reference frame list to list frames saved in a reference frame buffer;
the processor further to switch the computer system to an inter-frame mode and to select a reference frame from the reference frame list;
a codec to compress additional received frames using the selected reference frame;
the processor to improve the reference frame using partial self-refresh updates before compressing; and
the processor to send the additional frames to the display through the display transport compressed in the inter-frame mode.

15. The system of claim 14, wherein improving comprises:
identifying dirty rectangles of the reference frame;
prioritizing the identified dirty rectangles based on a quality of each dirty rectangle; and
performing the partial self-refresh updates in order of the prioritization constrained by available bandwidth.

16. A computing system comprising:
a display transport;
a display device having a receiver to receive compressed frames from the display transport, a decoder to decompress the received frames and a panel to display the decompressed frames; and
a computing device coupled to a source to provide frames for transmission through the display transport to the display device, the computing device having a reference frame list to list frames saved in a reference frame buffer, a codec to compress received frames in an inter-frame compression scheme using a selected reference frame from the reference frame buffer, and a processor to improve the reference frame using partial self-refresh updates before compressing, to send frames to the display transport without inter-frame compression in an intra-frame mode, to switch to an inter-frame mode and to select a reference frame from the reference frame list, and to send additional frames to the display through the display transport compressed in the inter-frame mode.

17. The system of claim 16, wherein the reference frame is the last frame sent in the intra-frame mode.

18. The system of claim 16, wherein the processor is further to monitor performance of the codec by measuring a frame time of the inter-frame compression and to send frames in the intra-frame mode when the codec performance is less than a threshold.

* * * * *